United States Patent [19]

Tsujisawa

[11] Patent Number: 4,831,471
[45] Date of Patent: May 16, 1989

[54] SYSTEM FOR POSITIONING A MAGNETIC HEAD AT A CENTER LINE OF A FLOPPY DISK TRACK

[75] Inventor: Takahiko Tsujisawa, Tokyo, Japan

[73] Assignee: NEC Corporation, Tokyo, Japan

[21] Appl. No.: 63,623

[22] Filed: Jun. 19, 1987

[30] Foreign Application Priority Data

Jun. 19, 1986 [JP] Japan .................................. 61-141340

[51] Int. Cl.⁴ .......................... G11B 5/55; G11B 5/596
[52] U.S. Cl. ............................... 360/78.04; 360/77.04; 360/77.08
[58] Field of Search ...................... 360/77, 78, 75, 109; 369/32, 33, 41, 43, 44

[56] References Cited

U.S. PATENT DOCUMENTS 4,135,217 1/1979 Jacques et al. ......................... 360/77
4,286,318 8/1981 Immink et al. ......................... 360/77

OTHER PUBLICATIONS

IBM TDB, vol. 21, No. 7, "Disk Runout Accommodation", Mantey, 12/78, pp. 2688-2691.

Primary Examiner—Alan Faber
Assistant Examiner—Steven R. Garland
Attorney, Agent, or Firm—Sughrue, Mion, Zinn, Macpeak and Seas

[57] ABSTRACT

A head positioning system capable of positioning a magnetic head at the center line of a target track of a floppy disk at high speed, in which a positioning controller prepositions the magnetic head within a predetermined distance from the center line of the target track based on a position error signal indicating the deviation of the magnetic head from the center line of the target track. A positioning compensation controller generates a compensation signal whose frequency is twice the disk rotational frequency so that the positioning compensation controller positions the magnetic head at the center line of the target track. A switching compensation controller connected to the positioning compensation controller enables the compensation signal to equal the output of the initial positioning controller during the prepositioning operation.

8 Claims, 2 Drawing Sheets

SYSTEM FOR POSITIONING A MAGNETIC HEAD AT A CENTER LINE OF A FLOPPY DISK TRACK

BACKGROUND OF THE INVENTION

The present invention relates to a head positioning system which drives a magnetic head from a current track to a target track in the radial direction of a magnetic disk. More particularly, the present invention relates to a head positioning system for floppy disk drives employing a closed loop servo control for positioning the magnetic head.

In a conventional floppy disk drive, the magnetic head is driven to a target track of the floppy disk by an open-loop controlled step motor. For this reason, the track width is determined by the drive pitch of the step motor and is relatively wide enough to render negligible the effects of track eccentricity. The track eccentricity includes a first component caused by disk exchange, which has the same frequency as that of the disk rotation, and a second component caused by environmental change, such as temperature and humidity changes, which has twice the frequency of the disk rotation.

In order to increase the recording capacity of the floppy disk, the track density must be increased, i.e., the track width must be reduced. However, an open loop head positioning system cannot realize a drastic reduction in the track width since the possible amount of reduction of the drive pitch of the step motor is mechanically limited and since the track eccentricity will not be negligible at a high track density.

A head positioning system employing a closed loop servo for a floppy disk drive is proposed in United States Pat. No. 4,630,145. In this system, each of a plurality of tracks is divided into a plurality of sectors. The servo information is recorded at the leading position of each of the sectors. A magnetic head reads the servo information and supplies it to a closed loop servo controller. The controller enables a fine step motor to move the magnetic head radially to a position near the center line of a target track in accordance with the servo information. The fine step motor moves the magnetic head by a pitch which is narrower than the track width every time the servo information is obtained. Thus, a fine track following operation is carried out using only servo information obtained from the leading portion of each of the sectors.

The sampling time of the servo information is determined by the speed of disk rotation and the number of sectors, both of which are predetermined. Accordingly, the sampling time cannot be shortened and is too long to permit the magnetic head to follow the second component of the track eccentricity with a high degree of accuracy. As a result, the conventional head positioning system cannot accurately position the magnetic head at the center line of the target track and as a result the track density must remain relatively low.

In order to enable the magnetic head to follow the second component of the track eccentricity, the inventor of the present invention has proposed a head positioning system in U.S. patent application Ser. No. 921,514 filed on Oct. 22, 1986. The head positioning system includes a closed loop servo system having a compensation digital filter which generates a compensation signal whose frequency is synchronized with the second component of the track eccentricity. The head positioning system can position the magnetic head at the center line of the target track with a high degree of accuracy after a track seek operation.

However, the head positioning system requires a relatively long period of time to position the magnetic head at the center line of the target track when the second component of the eccentricity of the target track is large, i.e., a deviation of the magnetic head from the center line of the target track is large when the closed loop servo is started to operate. Further, when the deviation of the magnetic head is larger than a track width, the head positioning system is apt to position the magnetic head at a center line of an outer or inner adjacent track to the target track by mistake.

SUMMARY OF THE INVENTION

Accordingly, an object of the present invention is to provide a head positioning system capable of positioning the magnetic head at the center line of a target track at high speed.

Another object of the present invention is to provide a head positioning system capable of positioning the magnetic head at the center line of a target track with a high accuracy even if the deviation of the magnetic head is larger than a track width when the closed loop servo system is started to operate.

A head positioning system according to the present invention comprises an initial positioning controller for prepositioning a magnetic head within a predetermined distance from the center line of a target track in accordance with a position error signal which indicates a deviation of the magnetic head from the center line of the target track, a positioning compensation controller for generating a compensation signal whose frequency is equal to twice a disk rotational frequency, whereby the positioning compensation controller positions the magnetic head at the center line of the target track by means of the compensation signal after the prepositioning operation of the initial positioning controller, and a switching compensation controller connected to the positioning compensation controller for enabling the compensation signal to be equal to the output of the initial positioning controller during the prepositioning operation.

BRIEF DESCRIPTION OF THE PREFERRED EMBODIMENT

Figure 1:
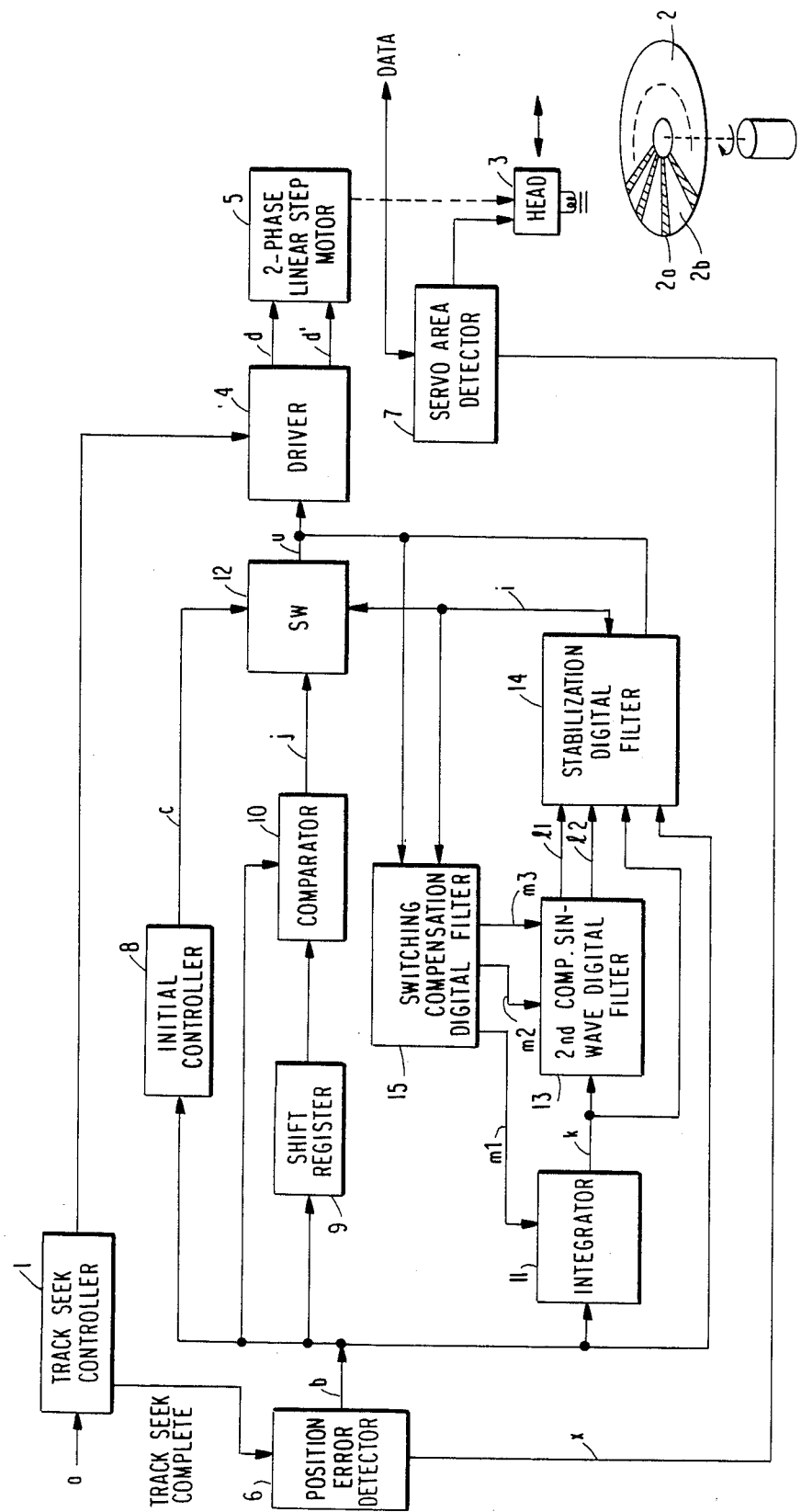
FIG. 1 is a block diagram of a head positioning system according to an embodiment of the present invention.

FIG. 1 shows a head positioning system according to an embodiment of the present invention. A track seek controller 1 receives a target track signal a which represents a target track of a floppy disk 2 on which the magnetic head 3 is to be positioned. The track seek controller 1 sends step pulses and a direction signal to a motor driver 4 in response to the target track signal a. The motor driver 4 moves a 2-phase linear step motor 5 stepwise by a drive pitch of the step motor 5 so that the magnetic head 3 is moved in the radial direction of the floppy disk 2. Thus, a track seek operation of the step motor 5 is carried out by an open loop control as is well known in the art.

After the track seek operation, the magnetic head 3 is not always positioned on the center line of the target track with high accuracy due to the temperature and humidity changes as described previously. Accordingly, the track seek controller 1 informs a position error detector 6 of the completion of the track seek operation in order to enable the head positioning system to perform a closed loop servo control for a track following operation.

The position error detector 6 is provided with a head position signal x to generate a position error signal b. The head position signal x is obtained from the magnetic head 3 via a servo area detector 7. The recording area of the floppy disk 2 is divided into 30 sectors each having a servo area 2a followed by a data area 2b. The magnetic head 3 reads servo information and data from the servo areas 2a and data areas 2b, respectively. The servo area detector 7 detects boundaries of the sectors according to the read-out signal of the head 3, and sends the read-out signal, i.e., the servo information to the position error detector 6 as the head position signal x while the head 3 is positioned on the servo areas 2a. Such a servo information in the servo area 2a and servo area detector 7 are disclosed in U.S. Pat. No. 4,400,747.

The rotation speed of the floppy disk 2 is set at 300 r.p.m. (5 Hz) and the recording area of the floppy disk 2 is divided into 30 sectors. Accordingly, the head position signal x is obtained at sampling times T which occur every about 6.67 msec. The position error detector 6 generates the position error signal b which represents the deviation of the magnetic head 3 from the center line of the target track. The position error signal b is sent to an initial positioning controller 8, a shift register 9, a comparator 10, an integrator 11 and stabilization digital filter 14 at every sampling time T.

The initial positioning controller 8 calculates an equilibrium point c for determining a stop position of the step motor 5 in accordance with the error signal b. The calculating time period for the equilibrium point c is set at a constant value $\Delta(=0.5$ msec). The initial positioning controller 8 supplies the equilibrium point c to a switching circuit 12.

The integrator 11 integrates the error signal b at every sampling time T to generate an integrated value k. The integrated value k is supplied to a second component sine-wave digital filter 13 and the stabilization digital filter 14.

The sine-wave digital filter 13 generates a sine-wave whose frequency is the same as the second component of the track eccentricity. As described previously, the second component is caused by temperature changes, humidity changes, and so on. In detail, the second component eccentricity stems from the fact that the track is deformed into an oval shape. Accordingly, the second component has a frequency twice the disk rotation frequency. Since the disk rotation frequency is set at 5 Hz, the digital filter generates a sine-wave of 10 Hz. The sine-wave generation is triggered by an impulse input.

The stabilization digital filter 14 calculates an equilibrium point i in accordance with the error signal b, the integrated value k and the outputs $l_1$ and $l_2$ of the digital filter 13. The calculating time period for the equilibrium point i is set at a constant value $\Delta$ (=0.5 msec). The stabilization digital filter 14 supplies the equilibrium point i to the switching circuit 12 during periods equal to the sampling interval T. The stabilization digital filter 14 acts as a phase-compensator for stabilizing the feedback control system.

The shift register 9 stores the position error signal b until the updated error signal b is supplied. The comparator 10 compares the updated error signal b with the previous error signal b to output a switching control signal j. When the difference between the updated error signal b and the previous error signal b is larger than a predetermined value (about 7 $\mu$m), the comparator 10 enables the switching circuit 12 to output the equilibrium point c from the initial controller 8 as a selected equilibrium point u. When the difference is smaller than the predetermined value, the comparator 10 enables the switching circuit 12 to output the equilibrium point i from the stabilization digital filter 14 as the selected equilibrium point u. The selected equilibrium point u is supplied to the motor driver 4.

The motor driver 4 supplies drive currents d and d' to each phase of a 2-phase linear step motor 5, in accordance with the equilibrium point u. As is well known, an appropriate combination of the 2-phase motor currents can stop the step motor 5 at an arbitrary position. The motor driver 4 thus moves the motor 5 by a minute amount to position the magnetic head 7 toward the center line of the target track. The magnetic head 3 reads the servo information from the servo area 2a at the next sampling time T. The updated head position signal x is supplied to the position error detector 6.

Figure 2:
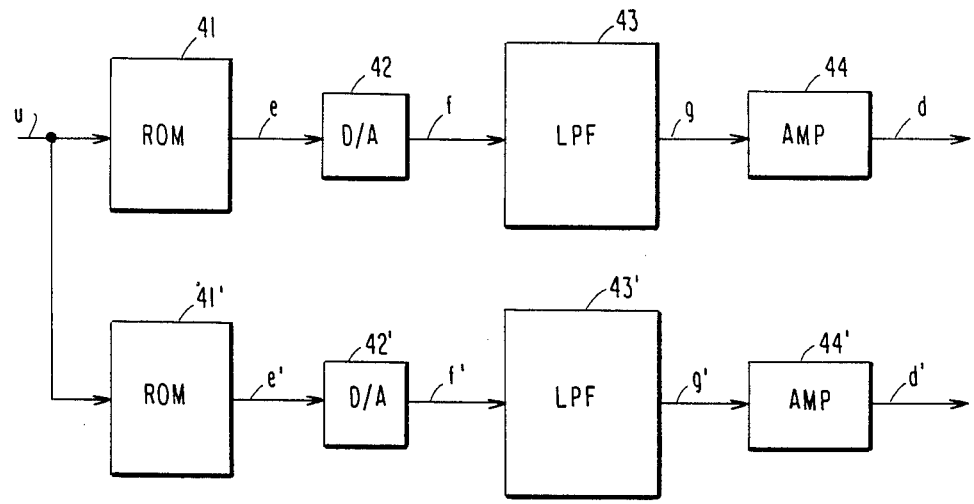
FIG. 2 is a block diagram of a motor driver used in the head positioning system shown in FIG. 1.

FIG. 2 shows a block diagram of the motor driver 4 which includes read only memories (ROMs) 41 and 41' for storing current values e and e' to be applied to the first and second phases of the motor 5, respectively, in correspondence to the equilibrium point u. The current values e and e' are represented by the equilibrium point u, a teeth pitch $\lambda$ of the rotor (or stator) of the step motor 5 and a drive current $I_A$ to be applied to the first phase of the step motor 5 when only the first phase is energized (u=0) as follows;

$$e = \frac{I_A}{\sqrt{2}} \cos\left(\frac{2\pi}{\lambda} u\right)$$

$$e' = \frac{I_A}{\sqrt{2}} \sin\left(\frac{2\pi}{\lambda} u\right).$$

The current values e and e' in digital form are converted into analog form by digital to analog (D/A) converters 42 and 42'. Low pass filters (LPF) 43 and 43' cut off frequencies higher than the Nyquist rate of the output signals f and f' of the D/A converters 42 and 42'. Amplifiers 44 and 44' amplify the output signals g and g' of the LPFs 43 and 43' to generate the drive currents d and d'.

Referring back to FIG. 1, a switching compensation digital filter 15 is supplied with the equilibrium point i from the stabilization digital filter 14 and the selected equilibrium point u from the switching circuit 12. The digital filter 15 calculates the difference between the equilibrium points i and u to control the integrator 11, the second component sine-wave digital filter 13 and the stabilization digital filter 14 via its outputs m1, m2 and m3. When the switching circuit 12 selects the equilibrium point c as the selected equilibrium point u, the switching compensation digital filter 15 controls the intergrator 11 and the digital filters 13 and 14 such that the equilibrium point i is equal to the selected equilibrium point u, i.e., the equilibrium point c. When the switching circuit 12 selects the equilibrium point i as the equilibrium point u, the digital filter 15 does not operate since the equilibrium points i and u are equal. In other words, the equilibrium point i is equal to the equilibrium point c at the moment of the switching operation of the switching circuit 12. Accordingly, the performance of the closed loop track following operation control is smoothly switched from the initial controller 8 to the digital filters 13 and 14.

Figure 3:
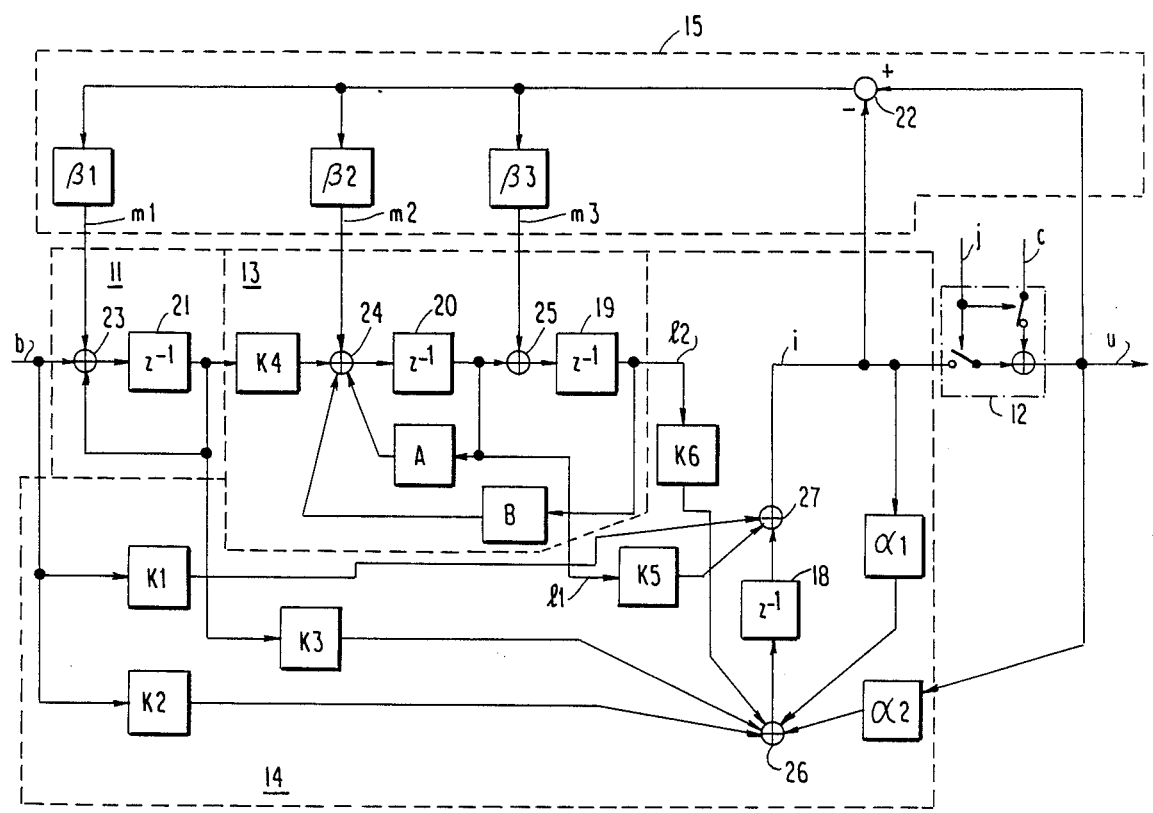
FIG. 3 is a block diagram showing the transfer function of a compensation digital filter and a switching compensation digital filter used in the head positioning system shown in FIG. 1.

FIG. 3 shows the relationships among the switching compensation digital filter 15, the integrator 11, the second component sine-wave digital filter 13, the stabilization digital filter 14 and the switching circuit 4 by means of the operator z of the Z-transform. In the figure, delay elements 18, 19, 20 and 21 represent a delay time equal to the sampling time period T. The characteristic of the second component sine-wave digital filter 13 is determined by parameters A, B and K4. Parameters K1, K2, K3, K5, K6, $\alpha 1$ and $\alpha 2$ in the stabilization digital filter 14 are the real constant which are determined to stabilize the head positioning system. Particularly, parameter $\alpha 1$ is for determining the eigen value of the delay element 18 in which the switching circuit 12 is open, i.e., the switching circuit 12 selects the equilibrium point c as its output u. The output u of the switching circuit 12 is multiplied by a parameter $\alpha 2$ and supplied to an adder 26 of the stabilization digital filter 14. The structures of the integrator 11 and the digital filters 13 and 14 are similar to those described in the aforementioned U.S. patent application Ser. No. 921,514 in which the different parameters are employed.

The switching conpensation digital filter 15 includes a subtracter 22 which calculates the difference between the output u of the switching circuit 12 and the equilibrium point i. The differential signal s is multiplied by a parameter $\beta 1$ and supplied to an adder 23 of the integrator 11. Similarly, the differential signal s is multiplied by parameters $\beta 2$ and $\beta 3$ and supplied to adders 24 and 25 of the sine-wave digital filter 13, respectively. The equilibrium point i is outputted from an adder 27. When the switching circuit 4 selects the equilibrium point c as its output u, parameters $\beta 1$, $\beta 2$ and $\beta 3$ determine the eigen values of the delay elements 21, 20 and 19, respectively.

First, when the switching circuit 12 selects the equilibrium point 1 as its output, i.e., the switching compensation digital filter 15 does not operate, the pulse transfer function $G_0(z)$ between the center line of the target track and the positional error of the magnetic head 3 is represented by a dinominator polynomial $D_{13}(z)=z^2-Az-B$ of the transfer function $G_{13}(z)$ of the second component sine-wave digital filter 13 as follows:

$$G_0(z) = \frac{(z-1)(z^2 - Az - B) N_{(z)}}{D_{(z)}}$$

wherein $D_{(z)}$ represents p (=1, 2, 3, ...)-order real coefficient polynomial whose solutions of $D_{(z)}=0$ all exist in the unit circle of the z-plane and $N_{(z)}$ represents (p−3)-order real coefficient polynominal of z.

Since the target position of the center line of the target track has a component of a sine-wave whose frequency is twice the disk rotation frequency, the target position r(z) obtained by the Z-transform is represented as follows:

$$\gamma(z) = \frac{K_z}{z^2 - Az - B}$$

(K: real constant)

According to the final value theorem of the Z-transform, the position error b is represented as follows:

$$\lim_{t \to \infty} b(t) = \lim_{z \to 1} (1 - z^{-1}) \cdot G_0(z) \cdot r(z)$$

$$= \lim_{z \to 1} (1 - z^{-1}) \cdot \frac{(z-1)(z^2 - Az - B) N_{(z)}}{D_{(z)}} \cdot \frac{Kz}{z^2 - Az - B}$$

$$= 0$$

The magnetic head thus follows the center line of a target track, i.e., the track eccentricity, with high accuracy.

Next, when the switching circuit 12 selects the equilibrium point c as its output, the system shown in FIG. 3 is regarded as a feedback control system for enabling the equilibrium point i to follow the equilibrium point c. Accordingly, the dinominator polynomial $D_c(z)$ of the transfer function $G_c(z)$ from the equilibrium points c to i is represented as follows:

$$D_c(z) = z^4 + (-\alpha 1 + \beta 2K5 - A - 1)z^3 + \{\alpha 1(A + 1) + \beta 1K3 + A + K5(\beta 3 + \beta 1K4 - \beta 2 - \beta 3B)\}z^2 - \beta 3AK5$$

Accordingly, the solutions of $D_c(z)=0$ all exist in the unit circle of the Z-plane by determining the values of parameters $\alpha 1$, $\beta 1$, $\beta 2$ and $\beta 3$. Thus, the feedback control system can be stabilized. Appropriate values of the parameters are as follows:

| | |
|---|---|
| A = −1.826921 | B = 1 |
| K1 = 1.865097 | K2 = 2.057516 |
| K3 = 2.333245 | K4 = 0.201189 |
| K5 = 0.261681 | K6 = −1.291938 |
| $\alpha 1$ = −1.242804 | $\alpha 2$ = −0.205438 |
| $\beta 1$ = −0.532832 | $\beta 2$ = −7.910963 |
| $\beta 3$ = 0.0 | |

Further, the equilibrium point i is represented as follows since the dinominator polynomial of the pulse transfer function from the points s to i includes a term (z−1):

$$\lim_{t \to \infty} i(t) = \lim_{z \to 1} (1 - z^{-1}) \cdot \frac{(z-1)N'(z)}{D_c(z)} \cdot \frac{Kz}{z-1}$$

$$= 0$$

Thus, the equilibrium point i follows the equilibrium point c. Accordingly, the equilibrium point i is equal to the equilibrium point c at the moment that the switching circuit 4 carries out the switching operation. As a result, the initial controller 8 is smoothly switched to the digital filters 13 and 14 for the track following operation.

In this embodiment, the track following operation, after the track seek operation, can be completed in about 13 msec which corresponds the time period of rotation time of 2 sectors. In the conventional head positioning system disclosed in U.S. patent application Ser. No. 921,514, about 33 msec to 66 msec is required for the track following operation.

The function of the head positioning system described above can be performed by a microprocessor. The 2-phase linear step motor 5 employed in this embodiment can be replaced by 3 or 4-phase step motor.

As described above, the head positioning system according to the present invention can position the magnetic head at the center line at high speed.

What is claimed is:

1. A head positioning system for positioning a magnetic head at a target track of a floppy disk which rotates at a disk rotational frequency comprising:
    a drive motor for driving said magnetic head in a radial directon of said floppy disk;
    a position error detector for generating a position error signal which indicates a deviation of said magnetic head with respect to a center line of said target track;
    an initial positioning controller for generating a prepositioning signal to preposition said magnetic head toward said center line of said target track in accordance with said position error signal;
    a positioning compensation controller for generating a compensation signal whose frequency is twice said disk rotational frequency, said positioning compensation controller positioning said magnetic head at said center line of said target track by means of said position error signal and said compensation signal after the prepositioning operation of said initial positioning controller;
    a switching compensation controller connected to said initial positioning controller and said positioning compensation controller for enabling said compensation signal to be equal to said prepositioning signal during said prepositioning operation;
    a motor driver for determining drive currents for said drive motor in response to said prepositioning signal or said compensation signal;
    and means for detecting a position of said magnetic head relative to said center line of said target track and for supplying a head position signal to said position error detector.

2. The head positioning system as claimed in claim 1, further comprising: a switching means for selecting one of said prepositioning signal and said compensation signal in accordance with the variation of said prepositioning signal and for supplying the selected signal to said motor driver.

3. The head positioning system as claimed in claim 2, further comprising:
    a shift register for storing a first position error signal until said position error signal is updated; and
    a comparator means for comparing said first position error signal with said updated position error signal;
    said comparator means sending a switching control signal to said switching means in order that said switching means selects said prepositioning signal when the difference between said updated position error signal and said first position error signal is larger than a predetermined value, and sending a switching control signal to said switching means so that said switching means selects said compensation signal when the difference between said updated position error signal and said first position error signal is less than said predetermined value.

4. The head positioning system as claimed in claim 1, wherein said drive motor is a two-phase step motor, said motor driver determining the drive current applied to each of the phases of said step motor.

5. The head positioning system as claimed in claim 1, wherein said motor driver further includes memory means for storing values of said drive currents in correspondence with said compensation signal.

6. The head positioning system as claimed in claim 1, further comprising:
    a track seek controller for transmitting step pulses and a direction signal to said motor driver in response to a target track signal, and for transmitting a signal to said position error detector upon completion of said track seek operation.

7. The head positioning system as claimed in claim 1 further comprising:
    an integrator for integrating said position error signal generated by said position error detector.

8. The head positioning system as claimed in claim 7, wherein said positioning compensation controller further comprises:
    a sine wave digital filter for generating a sine wave with a frequency equal the second component of the track eccentricity; and
    a stabilization digital filter for determining said compensation signal in response to said position error signal, said integrated position error signal and said sine wave generated by said sine wave digital filter.

* * * * *

UNITED STATES PATENT AND TRADEMARK OFFICE
CERTIFICATE OF CORRECTION

PATENT NO. : 4,831,471

DATED : May 16, 1989

INVENTOR(S) : TAKAHIKO TSUJISAWA

It is certified that error appears in the above-identified patent and that said Letters Patent is hereby corrected as shown below:

In the Abstract, line 3, delete "positioning" and insert --prepositioning--.

Signed and Sealed this

Thirteenth Day of March, 1990

*Attest:*

JEFFREY M. SAMUELS

*Attesting Officer*      *Acting Commissioner of Patents and Trademarks*